(12) United States Patent
Davis, III et al.

(10) Patent No.: US 8,792,868 B2
(45) Date of Patent: Jul. 29, 2014

(54) PERSONALIZED ELECTRONIC ADDRESS BOOK

(71) Applicant: AT&T Mobility II LLC, Atlanta, GA (US)

(72) Inventors: John Potts Davis, III, Marietta, GA (US); Jeffrey Clinton Mikan, Atlanta, GA (US); Fulvio Cenciarelli, Suwanee, GA (US); Stephen Thomas Hardin, Suwanee, GA (US); Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/870,150

(22) Filed: Apr. 25, 2013

(65) Prior Publication Data

US 2013/0244628 A1    Sep. 19, 2013

Related U.S. Application Data

(62) Division of application No. 11/947,686, filed on Nov. 29, 2007, now Pat. No. 8,478,309.

(60) Provisional application No. 60/953,951, filed on Aug. 23, 2007.

(51) Int. Cl.
    *H04W 4/16* (2009.01)

(52) U.S. Cl.
    USPC ......................... 455/414.1; 455/415

(58) Field of Classification Search
    USPC ................... 455/461; 370/351–360;
                        379/201.01–218.02; 709/204
    See application file for complete search history.

(56) References Cited

U.S. PATENT DOCUMENTS

| | | |
|---|---|---|
| 5,850,433 A | 12/1998 | Rondeau |
| 6,618,704 B2 | 9/2003 | Kanevsky et al. |
| 6,647,269 B2 | 11/2003 | Hendrey et al. |
| 7,756,534 B2 | 7/2010 | Anupam et al. |
| 7,856,360 B2 | 12/2010 | Kramer et al. |
| 2002/0057678 A1 | 5/2002 | Jiang et al. |
| 2002/0087632 A1 | 7/2002 | Keskar |
| 2003/0179866 A1* | 9/2003 | Stillman et al. ............ 379/88.19 |
| 2004/0054691 A1 | 3/2004 | Sharma et al. |
| 2004/0203642 A1* | 10/2004 | Zatloukal et al. .......... 455/414.1 |
| 2005/0118996 A1 | 6/2005 | Lee et al. |
| 2005/0165914 A1 | 7/2005 | Moore et al. |
| 2006/0047725 A1 | 3/2006 | Bramson |
| 2007/0060129 A1 | 3/2007 | Ramer et al. |
| 2007/0061245 A1 | 3/2007 | Ramer et al. |
| 2007/0061300 A1 | 3/2007 | Ramer et al. |
| 2007/0061301 A1 | 3/2007 | Ramer et al. |
| 2007/0061302 A1 | 3/2007 | Ramer et al. |
| 2007/0073717 A1 | 3/2007 | Ramer et al. |
| 2007/0073722 A1 | 3/2007 | Ramer et al. |

(Continued)

OTHER PUBLICATIONS

U.S. Appl. No. 11/893,787, filed Aug. 17, 2007, Michael H. Goldman.
"A Closer Look at Enhanced 911," *RedSky Technologies, Inc.*, 2005, 1-12.
Currier, B., "VoIP: Evolution of the PSAP Experience," *Intrado Government and External Affairs*, 2004, 1-19.

(Continued)

*Primary Examiner* — Kashif Siddiqui
(74) *Attorney, Agent, or Firm* — Baker & Hostetler LLP

(57) ABSTRACT

In some embodiments of the present disclosure the location of a mobile device can be used to manage a user's electronic address book and connect a user to various members of a directory.

18 Claims, 10 Drawing Sheets

(56) References Cited

U.S. PATENT DOCUMENTS

2007/0294096 A1 12/2007 Randall et al.
2008/0071554 A1 3/2008 Miles et al.
2013/0091200 A1 4/2013 Murphy
2013/0097281 A1 4/2013 Boudreau et al.

OTHER PUBLICATIONS

"FCC Amended Report to Congress on The Deployment of E-911 Phase II Services By Tier III Service Providers," *Federal Communications Commission*, 2005, 1-14.

"VoIP Emergency Calling Services," *Intrado Inc.*, 2003, 1-2.

* cited by examiner

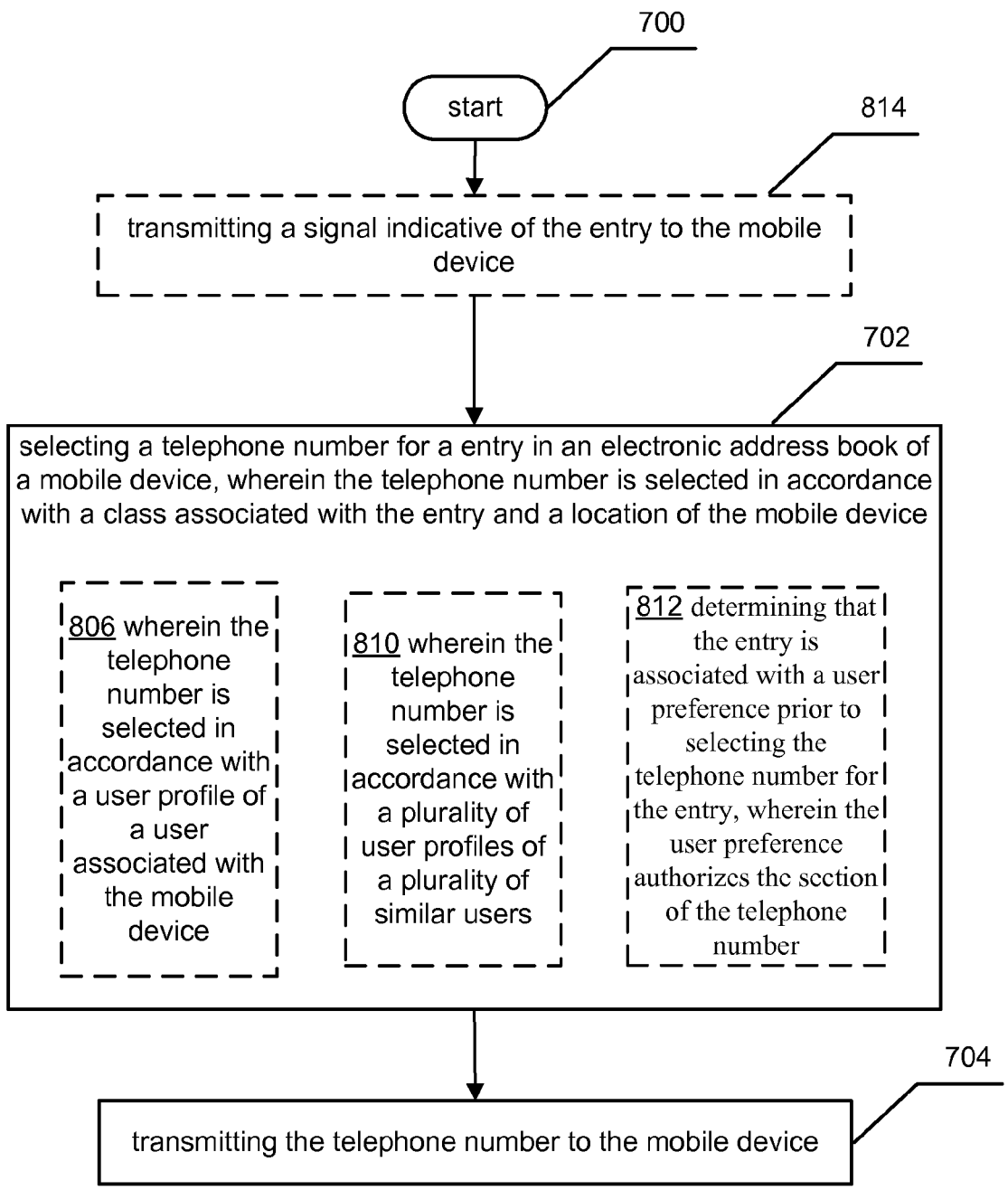

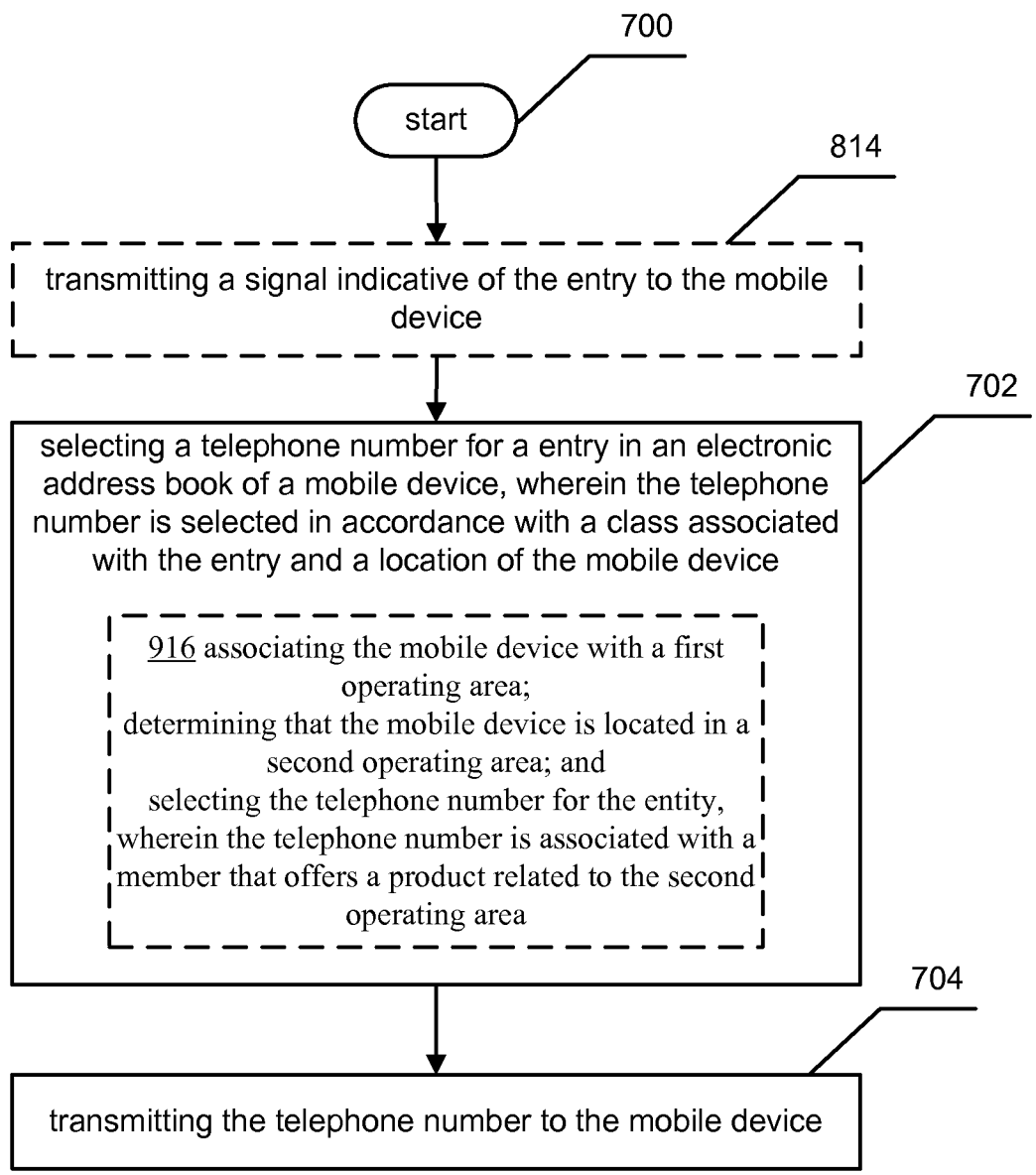

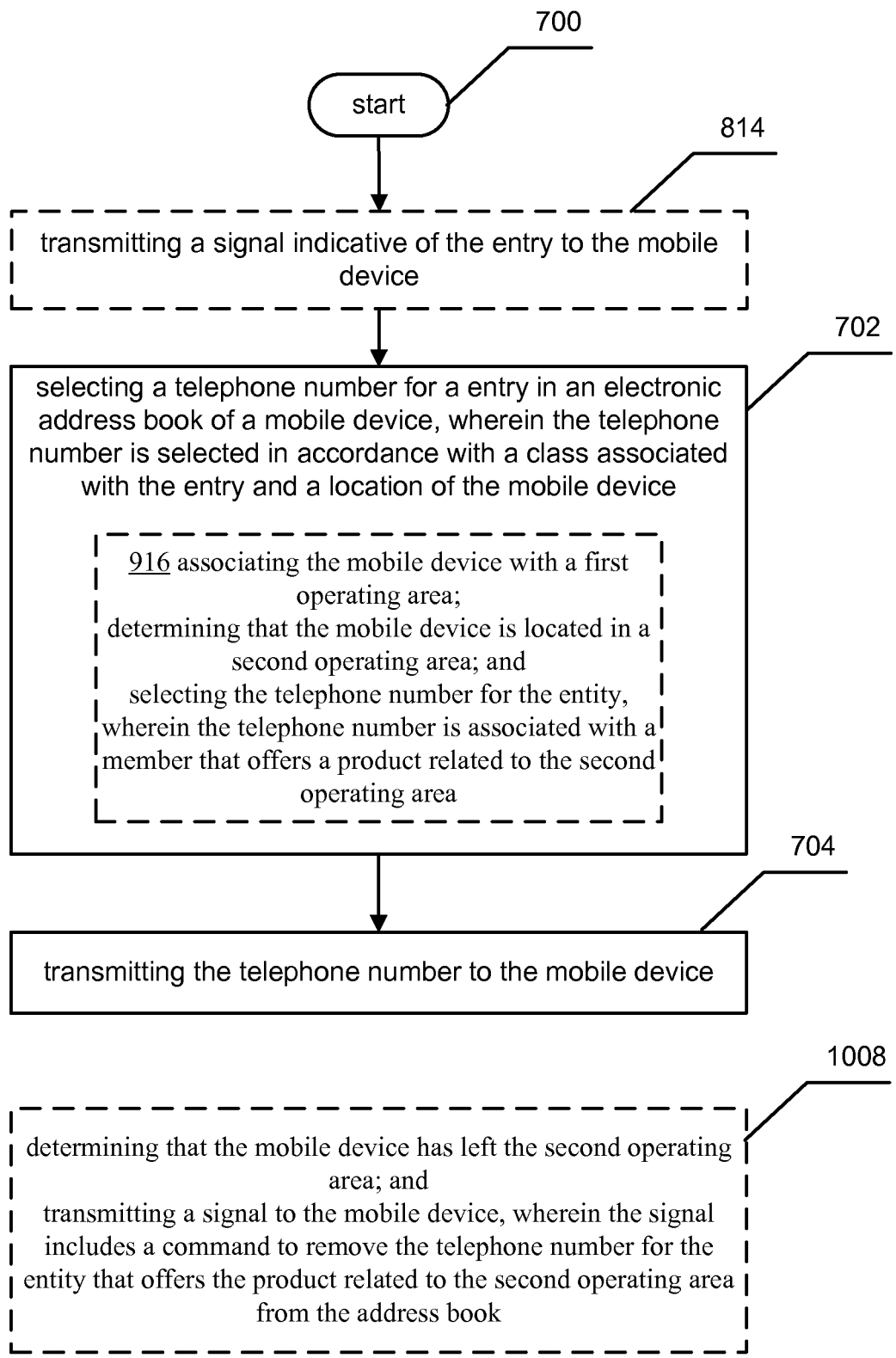

PERSONALIZED ELECTRONIC ADDRESS BOOK

CROSS REFERENCE TO RELATED APPLICATIONS

The instant application is a divisional application of, and claims priority to, U.S. patent application Ser. No. 11/947,686, filed Nov. 29, 2007. U.S. patent application Ser. No. 11/947,686 claims priority to U.S. provisional patent application No. 60/953,951, filed Aug. 3, 2007. U.S. patent application Ser. No. 11/947,686 is incorporated by reference herein in its entirety. U.S. provisional patent application No. 60/953,951 is incorporated by reference herein in its entirety.

BACKGROUND

A large number of people today own mobile devices; regard their mobile device as a necessity; and carry their device everywhere. This offers service providers unique opportunities to sell products to individuals that will always be connected to their device. This is evident in the fact that as technology advances, so has the number of products that have been incorporated into mobile devices, and offered to customers for a price.

Currently, the technological advances in this area have been directed towards targeted advertising, and targeted search results. While these services are important, these are just a few services that use data such as a customer's profile and their location.

SUMMARY

In an example embodiment, a method includes, but is not limited to, selecting a particular member of a class in response to receiving a call setup message, wherein the call setup message identifies the class, and the particular member is selected in accordance with a determination of a location of a mobile device that transmitted the call setup request and a physical address of the particular member, and using a telephone number associated with the particular member to establish a communication session with the particular member of the class. In addition to the foregoing, other aspects are described in the claims, drawings, and text forming a part of the present disclosure.

In another example embodiment, a computer readable storage medium includes, but is not limited to, instructions for transmitting, by a mobile device, a request to establish a communications session with an unidentified member of a class, wherein the class includes a plurality of members, each member of the plurality associated with a telephone number and a physical address, and instructions for connecting the mobile device to a particular member of the class, wherein the particular member of the class was selected in accordance with the location of the mobile device and a physical address of the particular member. In addition to the foregoing, other aspects are described in the claims, drawings, and text forming a part of the present disclosure.

In another example embodiment, a method includes, but is not limited to selecting a telephone number for an entry in an electronic address book of a mobile device, wherein the telephone number is selected in accordance with a class associated with the entry and a location of the mobile device, and transmitting the telephone number to the mobile device. In addition to the foregoing, other aspects are described in the claims, drawings, and text forming a part of the present disclosure.

It can be appreciated by one of skill in the art that one or more various aspects of the disclosure may include, but is not limited to, circuitry and/or programming for effecting the herein-referenced aspects; the circuitry and/or programming can be virtually any combination of hardware, software, and/or firmware configured to effect the herein-referenced method aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 8 illustrates an exemplarily operational flowchart including alternative embodiments of the operational flowchart depicted in FIG. 7.

FIG. 9 illustrates an exemplarily operational flowchart including alternative embodiments of the operational flowchart depicted in FIG. 8.

FIG. 10 illustrates an exemplarily operational flowchart including alternative embodiments of the operational flowchart depicted in FIG. 9.

DETAILED DESCRIPTION OF ILLUSTRATIVE EMBODIMENTS

Figure 1:
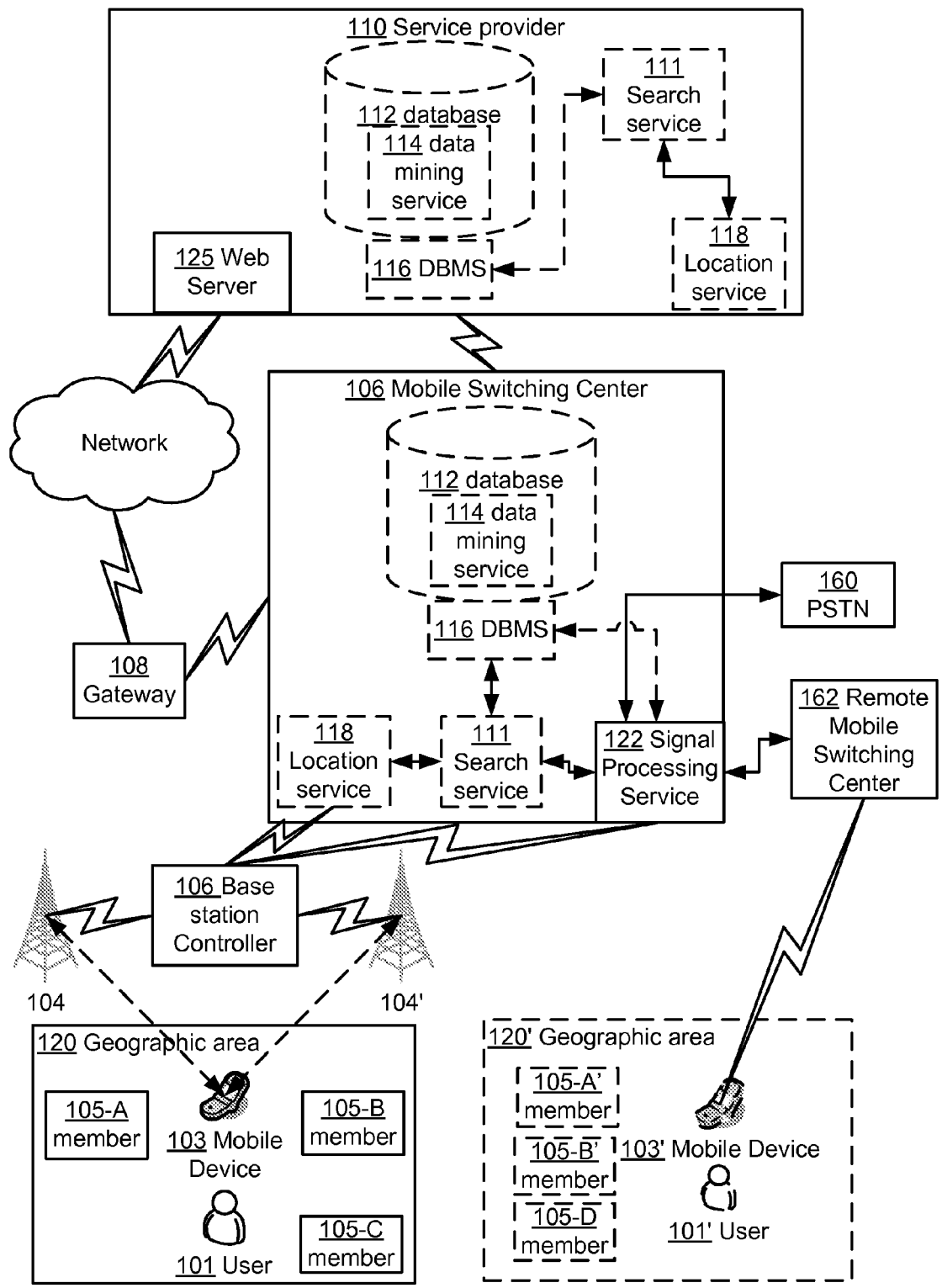
FIG. 1 depicts an example operating environment wherein operational procedures of the present disclosure may be practices.

Referring to FIG. 1, it depicts an example operational environment for describing example aspects of the present disclosure. The following description is general, and the example system of FIG. 1 is described in more detail below with respect its interrelationships with the example operational procedures described herein. One skilled in the art will note that the example elements depicted in FIG. 1 are illustrated to provide an operational context for practicing aspects of the present disclosure. Thus, the example operational context is to be treated as illustrative only and in no way limit the scope of the claims.

As illustrated by FIG. 1, the example operational environment includes a user 101 that may own, or have access to, a mobile device 103. One skilled in the art will appreciate that, while one mobile device 103 is depicted, the described system can be configured to service multiple mobile devices. In some example embodiments the mobile device 103 may be, for example, a cellular phone, a pocket pc, a personal digital assistant, or any device that communicates via a mobile communications protocol, such as the advanced mobile phone system protocol, a code division multiple access protocol, a time division multiple access protocol, etc. As shown by FIG. 1, the mobile device 103 can be in wireless communication with a base station 104. Generally, the base stations 104 and 104' can include any equipment necessary for transmitting and receiving radio (RF) signals from mobile device 103, and the base stations 104 and 104' may be operably coupled to a base station controller 106 that controls the base stations 104 and 104'. The second base station, base station 104', can operate similar to base station 104, but may service a different portion of geographic area 120.

The exemplarily system depicted in FIG. 1 also depicts a mobile switching center 106 that can be operably coupled to the base station controller 106. The mobile switching center 106 can provide services, such as voice services, data services, fax services, and short message services to the mobile devices within the area 120 that it serves. The mobile switching center 106 may be coupled to a gateway 108 that can act as an interface between the mobile network and a packet based network, such as the Internet. For ease of understanding, the mobile switching center 106 is depicted as including for example, the hardware and software necessary to effect packet based transmissions over RF in addition to network switching subsystems and functionality disclosed herein, and other implementations can exist. As illustrated by FIG. 1, and described in more detail below, in some example embodiments the mobile switching center 106 can include a combination of hardware, and/or software that can include, but is not limited to, a databases of information 112, a database management system 116 operably coupled to the databases 112, a location service 118, a data mining service 114, a search service 111, and a signal processing service 122.

In addition to being connected to a gateway 108, the mobile switching center 106 can be connected to a service provider 110. As depicted in FIG. 1, the service provider 110 may also include a combination of hardware, and/or software that can include, but is not limited to, a databases of information 112, a database management system 116 operably coupled to the databases 112, a location service 118, a data mining service 114, and/or a search module 111. In some example embodiments the location service 118, search service 111, and database 112 optionally located at the service provider 110 operate similarly to the location service 118, search service 111, and database 112 optionally located at the mobile switching center 106. One skilled in the art will note that elements 111, 114, and/or 118 are indicated in dashed lines, which is indicative of the fact that they are considered optionally located at their respective position in FIG. 1. One skilled in the art can also appreciate that elements 111, 114, and/or 118 are described herein as separate elements for clarity purposes, and that the disclosure is not limited to embodiments where separate services perform the functions described. More specifically, while elements 111, 114, and/or 118 are depicted, and described, as separate, one or more of them can be embodied in the same hardware, software, and/or firmware, i.e., in some embodiments a search module 111 may be part of the same process, circuitry, or a combination of hardware and software, as a location service 118. Additionally, one skilled in the art can appreciate that the database management program 116 may include one or more software programs designed to manage a database 112 that in some embodiments be a plurality of databases containing copies of the same information or a subset of data. Generally speaking, the database 112 can be configured to store user account associated with a plurality of users, and information related to the plurality of members located in a geographical area 120 or 120' for example.

As shown by FIG. 1, a mobile device 103 can move from a geographic area 120 to another area 120'. In some embodiments of the present disclosure, a geographical area can include, but is not limited to, the area code that the user's cellular phone is registered in, the geographical area the user 101 frequently visits, the area covered by a home location register (in a GSM network), the zip code of the area that the user lives in, a predetermined number of miles surrounding the address of the user, etc. In addition, FIG. 1 depicts a geographical area 120' that can include, but is not limited to, an area where the user is roaming, an area the user does not frequently visit, etc. Each geographical area, 120 and 120', may include a plurality of members, (105-A through 105-C in area 120, and 105-A', 105-B', and 105-D in area 120' for example) and a directory including information about them can be stored in a database 112. In one example, the information can include contact information for each member such as, the name of the place, the address, the telephone number, the email address, the fax number, the SMS number, or any other information relevant to contacting the member.

The following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various operational procedures. In addition, those skilled in the art will further appreciate that the style of presentation used herein also lends itself well to modular and/or object-oriented program design paradigms. Those skilled in the art will also note that some of the example operational procedures depicted are illustrated in dashed lines which is indicative of the fact that they are considered optional.

Figure 2:
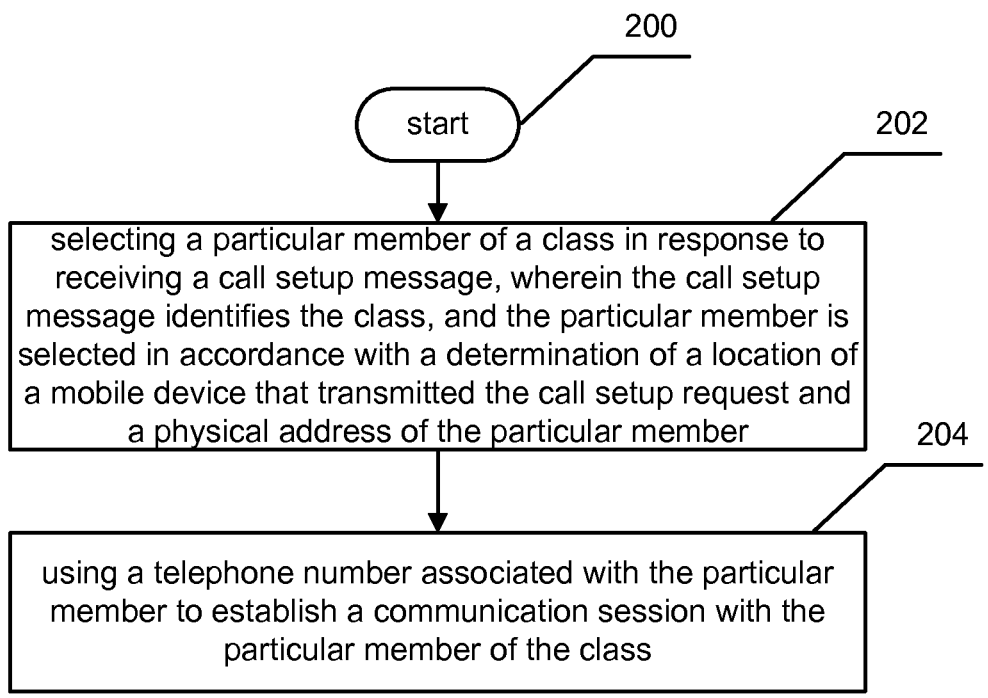
FIG. 2 illustrates an exemplarily operational flowchart depicting related to techniques for communicating over a mobile network.

Referring now to FIG. 2, it illustrates an operational flowchart illustrating techniques of the present disclosure. Operation 200 begins the operational process, and operation 202 illustrates selecting a particular member of a class in response to receiving a call setup message, wherein the call setup message identifies the class, and the particular member is selected in accordance with a determination of a location of a mobile device that transmitted the call setup request and a physical address of the particular member. For example, and referring to the example operational environment depicted in FIG. 1, a signal processing service 122 of the mobile switching center 106, can receive a call setup message from the mobile device 103. For example, in a mobile device network such as a GSM network, when a mobile device 103 attempts to establish a telephonic communication session it transmits a signal to a base station 104 indicative of a request to initiate a telephonic call with a member that is part of a class, e.g., by sending a call setup request message that includes XML identifying that the user wants the mobile switching center 106 to select a particular member for the user 101. The base station controller 106 can route the call to the mobile switching center 106 where it can be processed by a signal processing service 122. The signal processing service 122 can include a combination hardware, or a combination of hardware and software operable to authenticate the mobile device 103 and service the call by routing it to a base station controller it is associated with, or routing a call request to the appropriate termination point in either a public switched telephone network 160, or a remote mobile switching center 162.

In most situations, a call setup request message can generally include the telephone number of a network termination point, e.g., a telephone the user wants to connect with, however in certain embodiments of the present disclosure the call setup request message can identify a class, and leave the selection of a particular party to a search service 111 operating at either the service provider 110, and/or the mobile switching center 106. In order to select a particular member, each member in some embodiments is sorted into one or more classes. A class in some embodiments can include members of a group that share common attributes, characteristics, and/or traits. For example, a class of a restaurants could be defined as Italian and could include pizzerias, or restaurants that are known for a spaghetti dish. In some embodiments a class can be narrowly defined, e.g., it may only include members that share a common brand and could only include stores branded as The Gap®. In another embodiment, the class can be broader than in the preceding example, for example, a class could be 'consumer electronics stores' and could include members such as Best Buy® and/or Compusa®. In these example embodiments, a member can include a place or a business associated with a telephonic number and/or a physical address.

The service provider 110 can maintain a directory of information in a database 112 including the names, addresses, and telephone numbers of each member. In one example embodiment this information could be obtained from the members themselves. For example. each member could provide information to the service provider 110 that identify products they offer. Each member can provide contact information for their branches, i.e., addresses, phone numbers, etc. In some instances the members could self identify one or more classes that they belong to and the directory can be organized accordingly. A data mining service 114 can be configured to process this information and work in conjunction with a database management system 116 to generate relationships between different members in the database 112. More specifically, in some cases, the DBMS 116 can create a relationship that links a branch of a store (member 105-A in area 120, for example) to another branch of the same store in a different area (member 105-A' in area 120' for example). Or put another way, an entry in the database 112 for 'Best Buy®' may include the addresses, and phone numbers of all the Best Buy® stores.

In one embodiment of the present disclosure, the selection of the particular member can be performed by a search service 111 operating in conjunction with a location service 118. For example, and as shown by FIG. 1, a location service 118 can be configured to locate a mobile device 103 within a network. For example, in one embodiment, the location can be determined by comparing data from multiple base stations 104 and another base station 104'. In this example, a mobile device 103 can be operating in connected to a mobile network and can transmit/receive data at predetermined intervals allowing the base station controller 119 to find it if a telephone call needs to be sent to the device. The mobile switching center 106, can accomplish this by analyzing data such as the signal strength of the return message sent by a mobile device 103, the time deference between when a signal was sent from a tower, and when the tower receives a response from the mobile device 103, etc. In another example, the position of a mobile device 103 can be determined by using a technique that triangulates the position of the mobile device 103 by determining, at multiple towers, what direction mobile device signals were received from, and figuring out where the intersection between the towers is. In another example embodiment, the device 103 may include a GPS or an A-GPS subsystem. In embodiments that include GPS, or A-GPS, a network of satellites may capture position data for the mobile device 103; pinpoint a device's location; and transmit the information to the location service 118. In yet another embodiment, the mobile device 103 can include a short wave radio transceiver such as an RFID subsystem. In these embodiments, the RFID subsystem can send signals to RFID transmitters located at a plurality of members that identify the mobile device, and the member(s) can forward that information to the location module 118 via a network connection.

In some example embodiments the search service 111 can select a particular member of a class by comparing the addresses of the members associated with the class to the location of the mobile device 103 to select the member closest to the mobile device 103. In a more specific example, the search service 111 can be configured to use the location information such as the latitude and longitude that identifies the location of the mobile device 103 and the class identified in a call setup request message to search a database 112 for the closest member of the class. The search service 111 can search the directory of information and determine that for example, there are two members 105-A and 105-B in area 120 that belong to the class and select member 105-A since its address is closest to the location of the mobile device 103.

Continuing with the description of FIG. 2, operation 204 illustrates using a telephone number associated with the particular member to establish a communication session with the particular member of the class. Referring to FIG. 1, once the particular number is selected by the search service 111, the mobile switching center 106 can allocate a voice circuit between the mobile device 103 and the selected member, for example member 105-A. In this example, the user of the mobile device 103 can be connected to the closest member of the class as they are attempting to make an out going call to.

Figure 3:
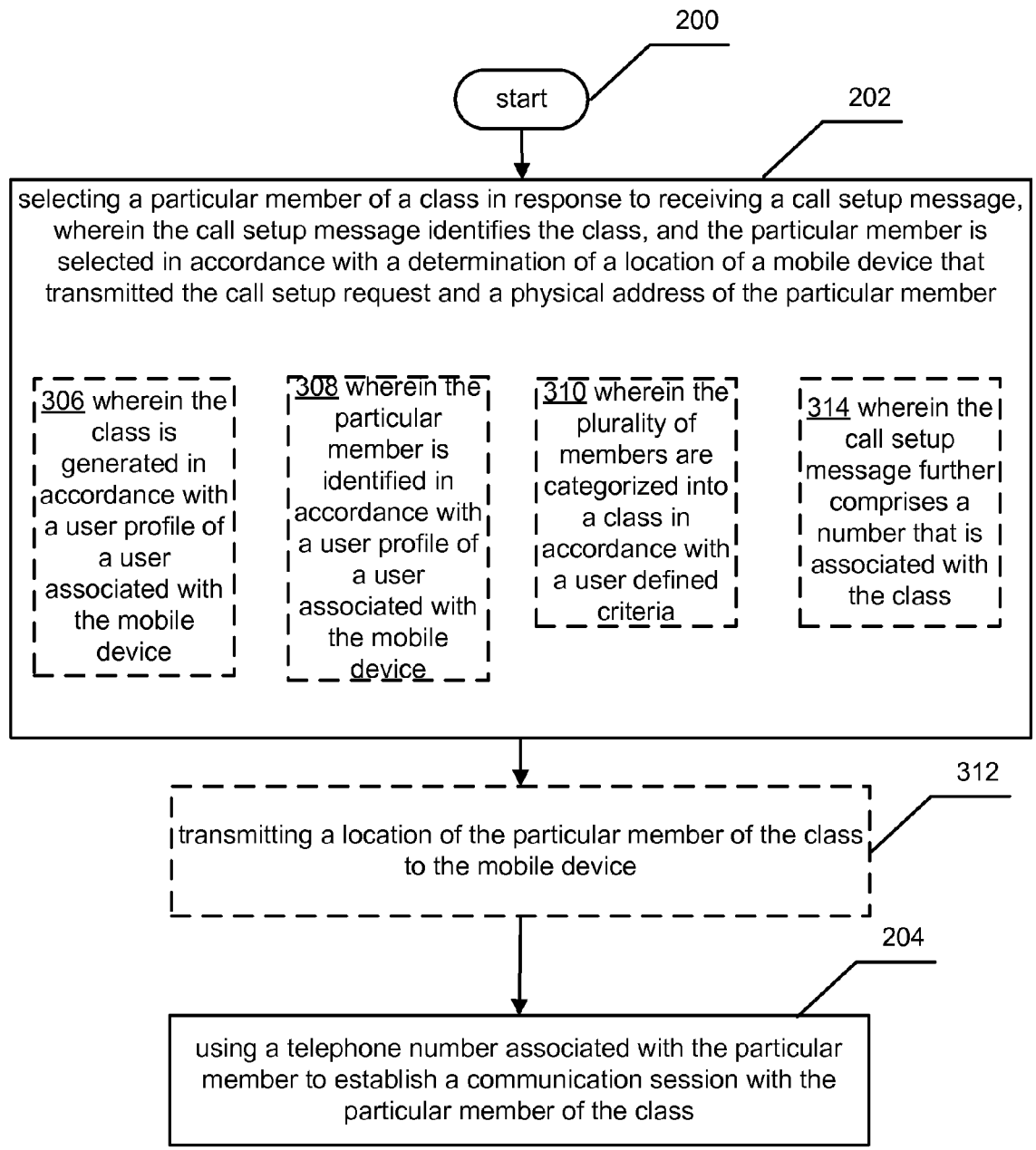
FIG. 3 illustrates an exemplarily operational flowchart including alternative embodiments of the operational flowchart depicted in FIG. 2.

Referring now to FIG. 3, it depicts alternative embodiments of the operational procedure of FIG. 2 including additional optional operations 306, 308, 310, 312, and 314. Referring to operation 306, it illustrates the operational procedure of FIG. 2, wherein the class is generated in accordance with a user profile of a user associated with the mobile device. For example, in at least one embodiment of the present disclosure, a data mining service 114 can generate a class that could be of interest to the user 101 using information obtained from a user profile of the user 101 that is associated with the mobile device 103. A user 101 in some embodiments can be considered associated with a mobile device 103 if they have an account with the service provider 110. For example, a user 101 may subscribe to one or more services offered by a service provider 110. Generally, if the service provider 110 offers cellular services when a user 101 subscribes to a service, the service provider 110 will create a profile for the user 101 that includes an identifier linking, i.e., associating, the user's profile to an account for a mobile device 103. If the mobile device 103 is a mobile phone for example, the service provider 110 can assign a phone number to the phone and associate that phone number with the user 101. In another embodiment, the user 101 may already have a mobile device 103, and provide the phone number of their device to the service provider 110 to associate the mobile device 103 with the user 101.

In some example embodiments the data mining service 114 can generate a class using information about the user 101 obtained from the user profile. For example, the information stored in the user's profile may include, but is not limited to, information explicitly given by a user 101, e.g., account information like a social security number, a drivers license number, a home address, a job description, group membership information, i.e., whether they are members of a family group, a work group, and/or members of a group based on their traits, such as, single, mid-20s, car owner, home owner, etc. In some embodiments, the user profile may contain information such as what products, e.g., goods and services, the user 101 has purchased in the past from the service provider 110, or from a website affiliated with the service provider 110. Furthermore, in some embodiments, purchasing information for the user 101 can be obtained from members 105-A through 105-C that may agree to provide the service provider 110 with information such as products the user has obtained from them.

Each product may have metadata associated with it that describes the product. The database management system 116 can create relationships between products based on common attributes. Each user 101 can also have a user profile that identifies what products, they have purchased in the past or products they are interested in. A data mining service 114 can infer that a user 101 that has purchased one product will probably have similar tastes as a person that bought the same product on a separate occasion. As described briefly above, the information indicating what products a user 101 purchased can be obtained in one embodiment by monitoring the internet usage of the user 101. A user 101 may access the Internet via a mobile device's internet browser to view, or purchase, products online. A copy of the web pages viewed by the user 101, or the url of the web pages may be recorded by, for example, the mobile device 103, and/or the mobile switching center 106. This information can be transmitted to the service provider 110 and associated with the profile of the user 101. In another embodiment, the service provider 110 may affiliate with members 105-A through 105-C. The members 105-A through 105-C, i.e., stores in this example, may provide information about products purchased by the user 101 to the service provider 110. In another example embodiment, the service provider 110 may send advertisements to the user 101 that display products that were purchased by users with similar tastes, and monitor the user's response to the advertisements. In this example, the service provider 110 may allow for the user 101 to indicate whether they already own the product, or ask them to rate the product. The service provider 110 may provide the user 101 with some incentive to provide feedback, such as by giving the user 101 coupons that can be used at stores. In addition to collecting information about the user 101, the system may collect information from any other user of the system.

This information can be leveraged by the data mining service 114 to identify a class that could be of interest to the user. For example, if a user purchases a plurality of videogames from a consumer electronics store, the data mining service 114 can infer that the user 101 buys lots of videogames and buys them from a specific store. The data mining service 114 can create a class that reflects this preference in a database 112. In this example the data mining service 114 could define a class narrowly, e.g., the class could only include branches of the particular stores, or broadly, e.g., the class could include any store that sells videogames. The data mining service 114 can then store the inferred class in the database 112. A process monitoring the database 112 can identify that there has been an update to the user's profile and propagate the class update to the mobile switching center 106. From there, the signal processing service 122 can transmit the class update to the mobile device 103 via an RF or packet based wireless network. In this example embodiment, a user 101 can then open an electronic address book of their mobile device 103 and view a contact for the inferred class. If the user attempts to send a call request for the class, the mobile switching center 106 can handle the request using techniques similar to those described above in FIG. 2.

Referring again to FIG. 3, it additionally depicts example operation 308 that illustrates the example operational flow 200 of FIG. 2, wherein the particular member is identified in accordance with a user profile of a user associated with the mobile device. For example, in some example embodiments of the present disclosure the data mining service 114 can generate a user profile for a user 101 using techniques similar to that described above with respect to operation 306. In this example embodiment, the user profile of the user 101 can be additionally leveraged by the search service 111 to select a particular member. For example, in some instances certain members can be considered part of the same class, however a specific user may prefer one member over the another for personal, or objective reasons, e.g., a user profile could identify that a user has a particular brand loyalty, or the user 101 may have given the member a low rating on a questionnaire, etc., and the search service 111 may select an particular member based on this information. In a specific example, a user profile may indicate that a user 101 purchases all their consumer electronics at a Best Buy®, for example member 105-A and the user's profile can reflect this taste. In this specific example the mobile device 103 can be located closer to another member, for example member 105-B that also sells consumer electronics. In the event that the search service 111 receives a request to select a particular member in the class of consumer electronics stores, the search service 111 can select member 105-A since the user 101 prefers the store.

Referring again to FIG. 3, it additionally depicts example operation 310 that illustrates the example operational flow of FIG. 2, wherein the plurality of members are categorized into a class in accordance with a user defined criteria. For example, in some embodiments of the present disclosure the service provider 110 can allow a user 101 to create a class and define the members they want in the class. For example, the service provider 110 can in some embodiments maintain a web server 125 that can in some embodiments include an HTTP server operable to handle HTTP requests and a back-end server for storing webpages. The web server 125 can be operable to allow a user 101 to log in a setup a customized class including desired members. For example, a webpage can include a directory of members and a user can pick and choose members that they want in their custom class. In a specific example, the user 101 can select a member such as 'post office', and/or any other courier company from a directory and submit a save request to the web server 125. The web server 125 can receive the request, and invoke hardware and/or software to generate the class including the selected members and store a copy of the information in database 112. A process monitoring the database 112 can determine that a contact for a new class has been added to the profile of the user and send information indicative of the new class to a mobile switching center 106. From there, the signal processing service 122 can transmit the contact for the new class to the mobile device 103 via an RF or packet based wireless network.

Referring again to FIG. 3, it additionally depicts example operation 312 that illustrates transmitting a location of the particular member of the class to the mobile device. For example, in some embodiments of the present disclosure, when the mobile switching center 106, receives a call setup message from the mobile device 103 and a search service 111 located at either the mobile switching center 106 or the service provider 110 identifies the particular member, the signal processing service 122 can transmit a call processing message back to the mobile device 103. In some instances, the call processing message can include a signal that indicates to the mobile device 103 that the call is being attempted by the mobile switching center 106 by displaying, for example, a 'connecting' dialog box on the user interface of the mobile device 103. In addition, in some instances, the search service 111 can select the particular member and send the name, address, and number to the signal processing service 122. The signal processing service 122 can modify the call processing message to include the number of the selected member, the location of the appropriate member, and/or the name of the particular member. The mobile device 103 can process the call processing message and display the location of the appropriate member a user interface of the mobile device 103 along with the name, and number of the particular member the signal processing service 122 is attempting to connect with. In a specific example embodiment, the user interface of the mobile device 103 can display the location of the mobile 103 and the location of the selected member on a mini-map of the area. In this example, the user can see where the selected member is in relation to where they currently are.

Referring again to FIG. 3, it additionally depicts example operation 314 that illustrates the example operational flow of FIG. 2, wherein the call setup message further comprises a number that is associated with the class. For example, in some embodiments each class can be associated with a number and the call setup request message can include the number. The signal processing service 122 can be configured to receive call setup messages from mobile devices that include numbers associated with classes in addition to handling call setup messages that include numbers associated with termination points such as mobile phones or landline phones. The signal processing service 122 can in some instances identify call setup messages for connects associated with a class by looking up each number it receives and route the number to the search service 111. In this example, the search service 111 can receive the number and lookup what class the number is associated with to determine what types of members to search for.

Figure 4:
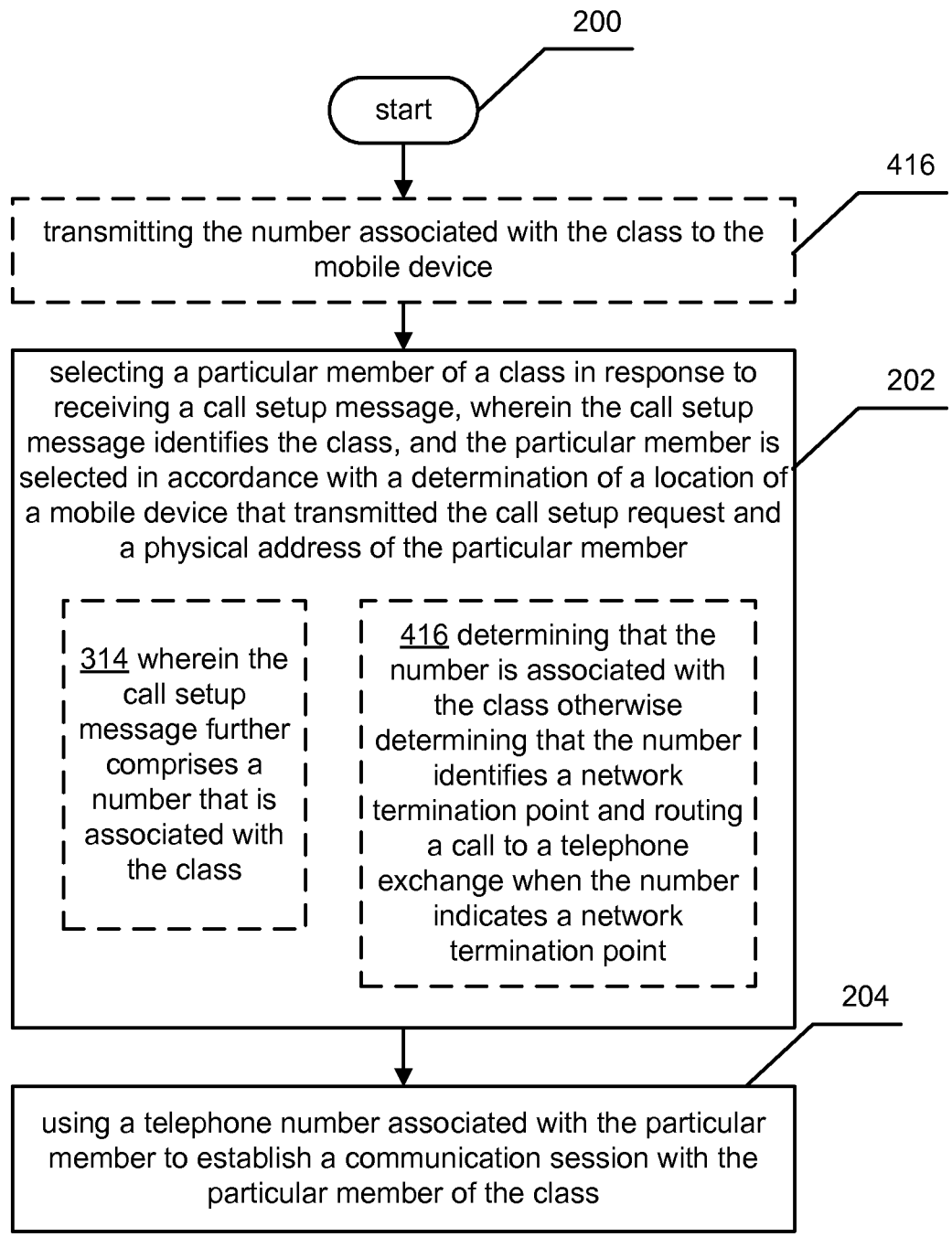
FIG. 4 illustrates an exemplarily operational flowchart including alternative embodiments of the operational flowchart depicted in FIG. 3.

Referring now to FIG. 4, it depicts an alternative embodiment of the operational flowchart 200 of FIG. 3 including example operation 416. This example operational flowchart depicts an embodiment of the flowchart of FIG. 3, wherein identifying a particular member of the class further comprises determining that the number is associated with the class otherwise determining that the number identifies a network termination point and routing a call to a telephone exchange when the number indicates a network termination point. For example, as described above in the preceding paragraph, in some embodiments of the present disclosure the signal processing service 122 can be configured to monitor incoming call setup request messages. The signal processing service 122 can include hardware and/or software configured to parse the incoming requests to identify setup messages that are associated with classes using techniques disclosed above. If however, the number in the call setup request message is associated with a termination point, the signal processing service 122 can service the request, or route the number to the public switched telephone network 160, or a remote mobile switching center 162 that can handle the request. In the event that a setup request message associated with a class is identified, the signal processing service 122 can route the number to the search service 111. In some instances the signal processing service 122 can determine whether a call is related to a class, or to a termination point by looking each number up as the call setup request message is received. For example, the signal processing service 122 can be coupled to the database 112 and can have access to a table of known termination points. If a number is not listed in the table of known termination points the number can be routed to the search service 111. In another embodiment the signal processing service 122 can include a table of known classes. If the signal processing service 122 receives a call setup request message with a certain number associated with classes the signal processing service 122 can route the request to the search service 111. In some embodiments, all classes can be identified by a signal number and the setup request message can include a body that defines the class. In this example, if the signal processing service 122 receives the number, it can route the body of the message to the search service 111. In other embodiments, each mobile device 103 can be configured with a specific number that represents a class and each call setup request message can include a body that defines the specific class the user wants to connect with. In this example, if the signal processing service 122 receives the number from the appropriate mobile device 103, it can route the body of the message to the search service 111.

Referring again to FIG. 4 it additionally depicts example operation 416 that illustrates transmitting the number associated with the class to the mobile device. For example, in some embodiments of the present disclosure, the mobile switching center 106, or the service provider 110 can transmit the number associated with the class to the mobile device 103. In this example, once the mobile device 103 receives the number associated with the class the user 101 can submit call setup request messages for the class that the number is associated with. In one embodiment, the number can be transmitted to the mobile device 103 via a packet based network of the service provider 110. After predetermined criteria occur, e.g., time based criterion such as per day, week, month, or user initiated criterion such as user selecting an update button on the device 103, or saving something to their profile, the service provider 110 can transmit one or more packets of information indicative of a contact to the mobile switching center 106. From there the signal processing service 122 can transmit one or more packets of information indicative of the contact to the mobile device 103. The mobile device 103 can receive the one or more packets indicative of the contact and add the contact to an electronic address book of the mobile device 103.

Figure 5:
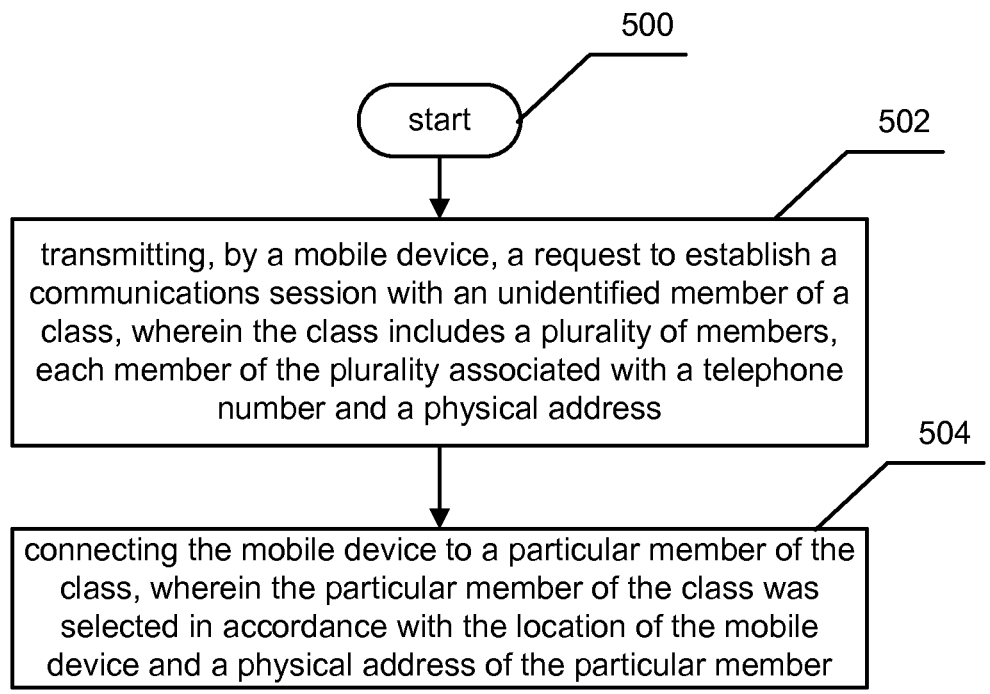
FIG. 5 illustrates an illustrates an exemplarily operational flowchart depicting related to techniques for communicating over a mobile network.

Referring now to FIG. 5, it depicts an example operational procedure related to communicating over a mobile network depicting example operations 500, 502 and 504. As shown by FIG. 5, operation 500 begins the operational procedure and operation 502 illustrates transmitting, by a mobile device a request to establish a communications session with an unidentified member of a class, wherein the class includes a plurality of members, each member of the plurality associated with a telephone number and a physical address. For example, in some embodiments of the present disclosure, a mobile device 103 can be configured to transmit a signal to a base station 104 indicative of a call setup request message. The base station 104 can forward the setup request message to signal processing service 122 of a mobile switching center 106 that can be operatively coupled to a service provider 110. In most situations, a call setup request message can generally include the telephone number of a network termination point, e.g., a telephone the user wants to connect with, however in at least one example embodiment the call setup request message transmitted by the mobile device 103 can be directed towards an unknown member of a class, e.g., the mobile device 103 leaves the selection of the particular number to the mobile switching center 106 or the service provider 110. In some embodiments, the contents of the call setup request message can include data identifying that the mobile device 103 is attempting to connect to an unidentified member of the class in for example, in a header or a bit set in the payload of the message. The payload of the message can optionally include an identifier that is associated with a particular class, the identifier can in some instances include a string of letters or numbers that can be used by the signal processing service 122 to identify that the mobile device 103 wants to connect to member of a specific class.

Similar to that described above, a class in some embodiments can include members of a group that share common attributes, characteristics, and/or traits. For example, a class of a restaurants could be defined as Italian and could include pizzerias, or restaurants that are known for a spaghetti dish. In another example, a consumer electronics class could include members such as Best Buy® and/or Compusa®. In these example embodiments, a member can include an individual or a business associated with a telephonic number and/or a physical address. The service provider 110 can maintain a directory of information in a database 112 including the names, addresses, and telephone numbers of each member. In one example embodiment this information could be obtained from the members themselves. For example. each member could provide information to the service provider 110 that identify products they offer. Each member can provide contact information for their branches, i.e., addresses, phone number, etc. In some instances the members could self identify one or more classes that they belong to and the directory can be organized accordingly. A data mining service 114 can be configured to process this information and work in conjunction with a database management system 116 to generate relationships between different members in the database 112. More specifically, in some cases, the DBMS 116 can create a relationship that links a branch of a store (member 105-A in area 120 for example) to another branch of the same store in a different area (member 105-A' in area 120' for example). Or put another way, an entry in the database 112 for "Best Buy®" may include the addresses, and phone numbers of all the Best Buy® stores.

Continuing with the description of FIG. 5, operation 504 illustrates connecting the mobile device to a particular member of the class, wherein the particular member of the class was selected in accordance with the licatoin of the mobile device and a physical address of the particular member. For example, in some embodiments of the present disclosure, the mobile device 103 can connect to a particular member of the class. Once a particular member of the class is identified, the mobile switching center 106 can route the call to a termination point associated with the particular member selected. The signal processing service 122 can receive an indication that the termination point is being rung, and transmit a signal to the mobile device 103 to enter a mode suitable for voice messages. The mobile device 103 can receive the signal; enter the suitable mode; and can connect with the particular member that was selected.

In some example embodiments the mobile device 103 can connect with a particular member selected by a search service 111 optionally located at the mobile switching center 106 or at the service provider 110. The search service 111 can in some instances use the information in the call setup request message to access a database 112 to identify members that belong to the class the user 101 is interested in. The search service 111 can be configured in an embodiment to identify the location of the mobile device 103 using functionality provided by the location service 118 described in more detail above. In some example embodiments the search service 111 can select a particular member of a class by comparing the addresses of the members associated with the class to the location of the mobile device 103 and select the member closest to the mobile device 103. In a more specific example, the search service 111 can be configured to use the location information such as the latitude and longitude identifying the location of the mobile device 103 and the class to search a database 112 for the closest member of the class. The search service 111 can search a directory of information and determine that for example, there are two members 105-A and 105-B in area 120 that belong to the class and select member 105-A since its address is closest to the location of the mobile device 103.

Figure 6:
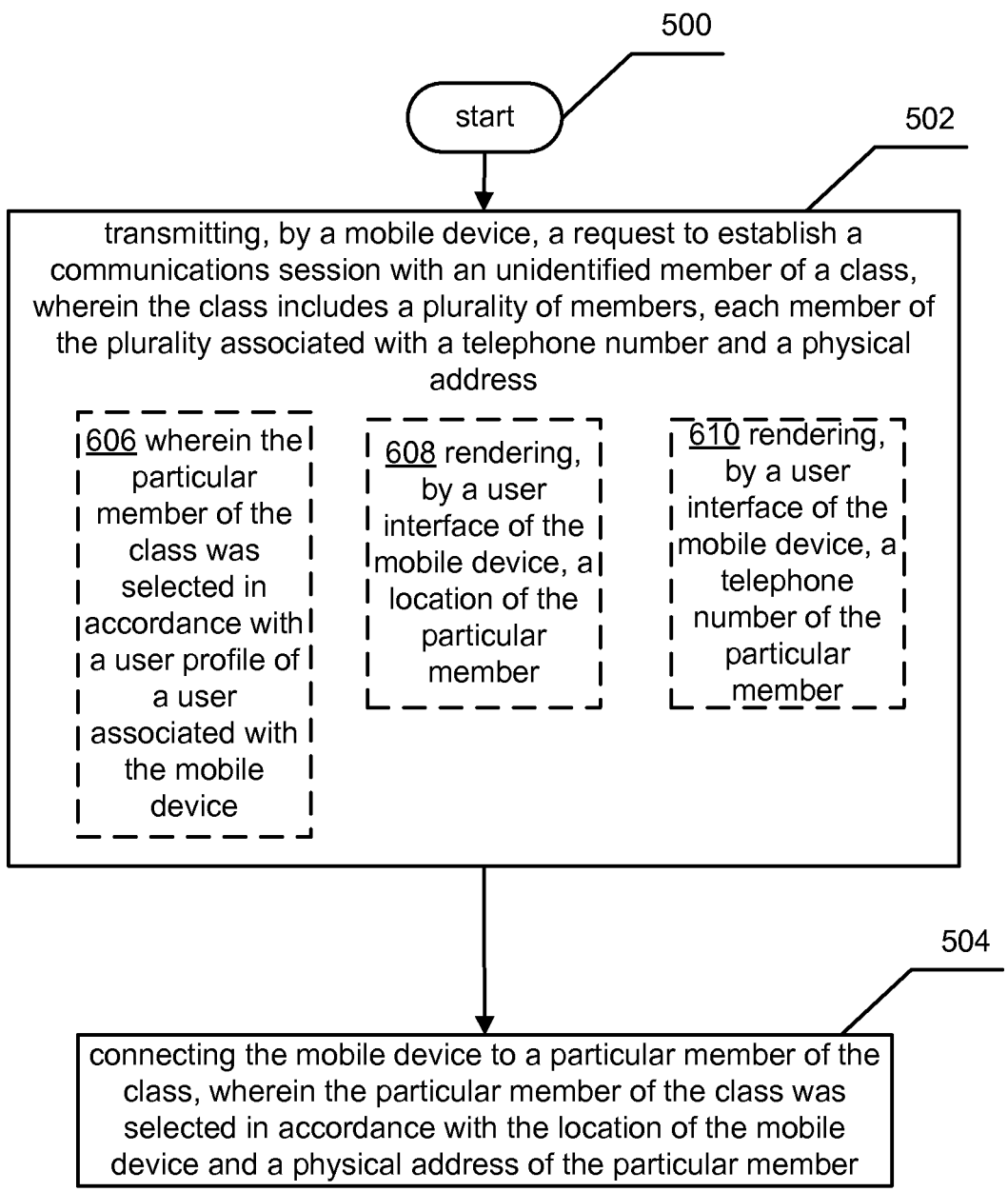
FIG. 6 illustrates an exemplarily operational flowchart including alternative embodiments of the operational flowchart depicted in FIG. 5.

Referring now to FIG. 6, it depicts alternative embodiments of the operational procedure of FIG. 5 including optional operations 606, 608, and 610. Example operation 606 depicts an alternative embodiment of the operational procedure described by FIG. 5, wherein the particular member of the class was selected in accordance with a user profile of a user associated with the mobile device. For example, in some example embodiments of the present disclosure the data mining service 114 can generate a user profile for a user 101 using techniques similar to that described above. In this example embodiment, the user profile of the user 101 can be additionally leveraged by the search service 111 to select a particular member. For example, in some instances certain members can be considered part of the same class, however a specific user may prefer one member over the another for personal, or objective reasons, e.g., a user profile could identify that a user has a particular brand loyalty, or the user 101 may have given the member a low rating on a questionnaire, etc., and the search service 111 may select an particular member based on this information. In a specific example, a user profile may indicate that a user 101 purchases all their consumer electronics at a Best Buy®, for example member 105-A and the user's profile can reflect this taste. In this specific example the mobile device 103 is located closer to another member, for example member 105-B that also sells consumer electronics. In the event that the search service 111 receives a request to select a particular member in the class of consumer electronics stores, the search service 111 can select member 105-A since the user 101 prefers the store.

Referring again to FIG. 6, operation 608 depicts an alternative embodiment of the operational procedure described by FIG. 5 including an operation that shows rendering, by a user interface of the mobile device, a location of the particular member. For example, in some embodiments of the present disclosure, the location of the particular member can be displayed on a user interface of the mobile device 103. For example, in some embodiments when the search service 111 has identified an appropriate member to contact, the signal processing service 122 can route a call to the selected member in the public switched telephone network 160, or a remote mobile switching center 162. The signal processing service 122 can then receive a signal indicating that the termination point has received the telephone number and is ringing the particular member. In one embodiment, during this time period, the signal processing service 122 can transmit a signal indicative of the location of the selected member (obtained from a database 112 for example) to the mobile device 103. The mobile device 103 can display a 'connecting . . . ' message on its user interface and can additionally display the location of the particular member on a map of the area. In some embodiments, the location of the mobile device 103, obtained by the location service 118, and/or directions to the particular member, can be rendered on the user interface. In other embodiments, the location of the particular member can be additionally rendered on the user interface during the call with the particular member, and/or after the call has been completed.

Referring again to FIG. 6, operation 610 depicts an alternative embodiment of the operational procedure described by FIG. 5 including an operation that shows rendering, by a user interface of the mobile device, a telephone number of the particular member. For example, in some embodiments when the search service 111 has identified a particular member to contact, the mobile switching center 106 can route a call to the selected member and the public switched telephone network 160, or a remote mobile switching center 162 can indicate to the mobile switching center 106 that it has received the telephone number and is ringing the particular member. In one embodiment, during this time period, the mobile switching center 106 can transmit a signal indicative of the telephone number of the particular member (obtained from a database 112 for example) to the mobile device 103. The mobile device 103 can display a 'connecting . . . ' message on its user interface and can additionally display the telephone number of the particular member. In addition to displaying the number while connecting, the mobile device 103 can also display the number during the call, and/or after the call has been completed.

Figure 7:
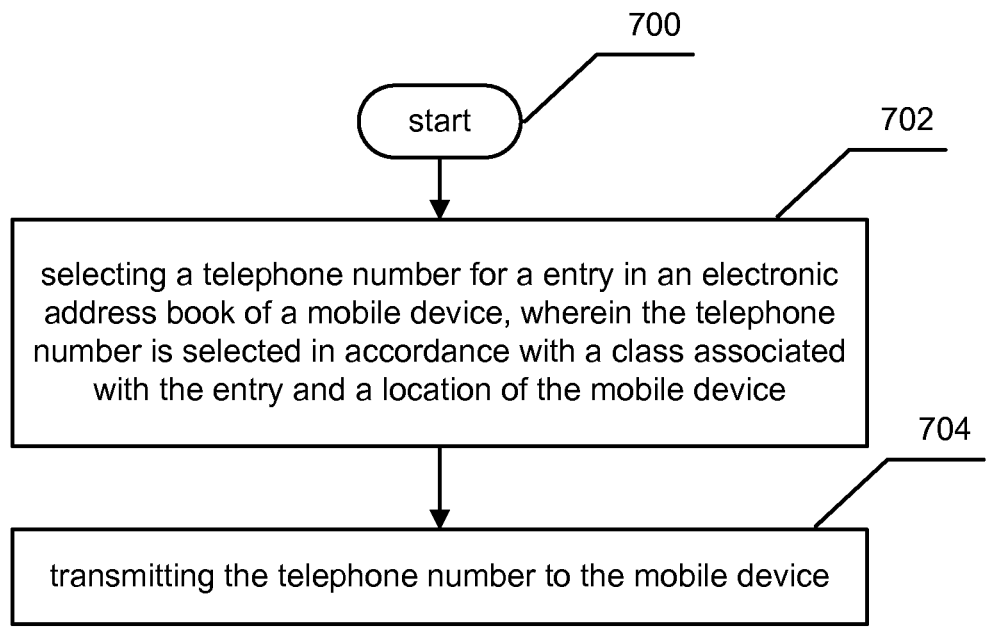
FIG. 7 illustrates an illustrates an exemplarily operational flowchart depicting related to techniques for managing an electronic address book.

Referring now to FIG. 7, it depicts example operations direct towards managing an electronic address book including operations 700, 702, and 704. As shown by FIG. 7, operation 700 begins the operational procedure and operation 702 illustrates selecting a telephone number for a entry in an electronic address book of a mobile device, wherein the telephone number is selected in accordance with a class associated with the entry and a location of the mobile device. For example, in some embodiments of the present disclosure, as a mobile device 103 moves through a mobile network the mobile switching center 106 can update a telephone number for an entry in an electronic address book of the mobile device 103. In some embodiments this update can use factors such as the class the entry belongs to and the location of the mobile device 103. In an example embodiment, an entry can include a contact, e.g., one or more fields including information such as name, address, and telephone number. Each entry can include metadata associating the entry with a class. For example, the metadata describing the class the entry is associated with could be embedded in a header for the contact. Similar to that described above, a class can include a group of members that share common attributes, characteristics, and/or traits. In one example this group could be narrowly defined such as only including members of a certain brand of business, e.g., the class could only include locations of a particular store. In another embodiment, the class could be defined more broadly and include any member of a genre, e.g., the could include any store that offers a similar product such as a class for 'Delivery Pizza Stores' could include any place that delivers pizza.

In some example embodiments of the present disclosure the service provider 110 can maintain a database 112 that includes the entries that are stored in the electronic address book of the mobile device 103 and other mobile devices. For example, the mobile device 103 can exchange information with the database 112 either at the service provider 110 and/or the mobile switching center 106 in order to keep both the database 112 and the mobile device 103 synchronized. In this example embodiment, each entry can be part of a class that includes a plurality of members. The service provider 110 can maintain a directory of information in the database 112 including all the members in a geographical area such as 120 and/or 120'. The directory can include the names, addresses, and telephone numbers of each member. Each member can include metadata associating it with one or more classes, e.g., a store such as Best Buy® could be included in a class of Best Buy® stores, and/or a class defined as 'consumer electronics' stores a the same time. In another embodiment, a data mining service 114 can process new members as they are added to the directory and generate metadata defining what classes the member belongs to and store the metadata in a database 112 along with the member's contact information.

As the mobile device 103 moves through the mobile network, a location service 118 described more fully above, can be configured to transmit location information to a search service 111. When predetermined criteria occur, i.e., criteria related to the position of the device, and/or criteria related to time based conditions, the search service 111 can be configured to use the current location of the mobile device 103 to search for a member of the same class. More specifically, at predetermined times, such as once every 10 seconds, every minute, half hour, or under predetermined conditions, e.g., the mobile device 103 registers with a new location register, enters a new area code, or connects with a new cellular tower 104', the search service 111 can check to determine if any contacts need to be updated by the system. In a specific example, if the user 101 includes a class in their electronic address book for 'police station' or an entry for 'emergency government service/law enforcement', each time the mobile device 103 switches from base station 104 to base station 104' the search service 111 could search a database 112 to look for a telephone number for the closest member of the class the entry is associated with.

In some embodiments, the class can be created by the service provider 110 and/or the user 101 themselves. For example, and as described above, a service provider 110 can configure mobile devices 103 to include predefined classes for entries such as police stations, fire stations, and/or hospitals. In other instances, the service provider 110 can also sell the right to list certain brands on the mobile device 103. For example, the service provider 110 can partition the mobile device 103 when it is shipped to retailers with an entry for a company. In some example embodiments the service provider 110 can maintain a web server 125 and allow users to create a custom class. For example, a user 101 could create a name for their class, and select businesses or places that they want to be listed in the class. Additionally in some embodiments the user could select a pre-generated class that includes members based on the product they offer. In yet another embodiment, the user 101 could answer a series of questions designed to figure out a class the user is interested in, or the user could select attributes from a list. In these embodiments the data mining service 114 can process the answers to the questions, or attributes selected and determine a class that is appropriate for the received input. In the above example embodiments, once the user 101 has finished creating custom classes they can save the changes. The changes can be processed by a backend server and stored in a database 112. The class can then in some instances be propagated to the mobile switching center 106 and transmitted to the mobile device 103 via an RF or packet based wireless network.

Referring again to FIG. 7, it additionally depicts operation 704 that illustrates transmitting the telephone number to the mobile device. For example, and in addition to the previous example, once a number for a member that is part of the class the entry is associated with is identified by a search service 111 located either the service provider 110 or the mobile switching center 106, the mobile switching center 106 can transmit one or more packets of data indicative of the number to the mobile device 103. More specifically, an entry update may occur, such that the substantive information for a contact, e.g., the location, telephone number, and or name, for the entry can be updated, e.g., an entry for 'police station' can be updated with the address, phone number, etc., of the police station closest to the mobile device 103. In another embodiment, instead of replacing the substantive information of a entry, the information for the update can be listed in addition to information about the old contact. This example embodiment allows the user 101 to contact the old place in addition to the place closest to the user.

Referring now to FIG. 8, it depicts an alternative embodiment of the operational procedure of FIG. 7 including the optional operations 806, 808, and 810. Operation 806 illustrates the example operational procedure 700 of FIG. 7, wherein the telephone number is selected in accordance with a user profile of a user associated with the mobile device. For example, in some embodiments of the present disclosure the search service 111 that selects a number can take into account a user profile of the user 101 associated with the mobile device 103. Similar to that described above, a user 101 can be considered associated with a mobile device 103 if they subscribe to a service offered by the service provider 110. In one example, the user 101 can provide the service provider 110 with information about themselves and a device identifier of the mobile device 103. The service provider 110 can create a relationship between the user 101 and the mobile device 103 and store this information in a database 112 In this example embodiment, the search service 111 can be configured to search for a member in the same class as is identified in the user's electronic address book using a profile of the user 101. For example, in some instances certain members can be considered part of the same class, however a specific user may prefer one member over the another for personal, or objective reasons, e.g., a user profile could identify that a user has a particular brand loyalty, or the user 101 may have given the member a low rating on a questionnaire, etc., and the search service 111 may select an particular member based on this information. In a specific example, a user profile may indicate that a user 101 purchases all their consumer electronics at a Best Buy®, for example member 105-A and the user's profile reflects this taste. In this specific example the mobile device 103 is located closer to another member, for example member 105-B that also sells consumer electronics. In the event that the search service 111 receives a request to select a particular member in the class of consumer electronics stores, the search service 111 can select member 105-A since the user 101 prefers the store.

In some example embodiments a user profile can be built by the data mining service 114 by processing information that identifies what the user 101 has purchased and/or where the user makes his or her purchases. For example, each product, e.g., a good or service, may have metadata associated with it that identifies the product. The database management system 116 can create relationships between products based on common attributes. Each user profile can identify what products they have purchased in the past or products they are interested in. A data service mining 114 can infer that a user 101 that has purchased one product, will probably have similar tastes as a person that bought the same product on a separate occasion. The information indicating what products, a user 101 purchased can be obtained in one embodiment by monitoring the internet usage of the user 101. A user 101 may access the Internet via their mobile device's Internet browser to view, or purchase, products online. A copy of the web pages viewed by the user 101, or the url of the web pages may be recorded by, for example, the mobile device 103, and/or a mobile switching center 106. This information can be transmitted to the service provider 110 and associated with the profile of the user 101. In another embodiment, the service provider 110 may affiliate with members 105-A through 105-C. The places 105-A through 105-C, i.e., stores in this example, may provide information about products purchased by the user 101 to the service provider 110. In another example embodiment, the service provider 110 may send advertisements to the user 101 that display products that were purchased by users with similar tastes, and monitor the user's response to the advertisements. In this example, the service provider 110 may allow for the user 101 to indicate whether they already own the product, or ask them to rate the product. The service provider 110 may provide the user 101 with some incentive to provide feedback, such as by giving the user 101 coupons that can be used at stores. In addition to collecting information about the user 101, the system may collect information from any other user of the system.

Continuing with the description of FIG. 8, operation 808 illustrates the example operational procedure 700 of FIG. 7, wherein the telephone number is selected in accordance with a plurality of user profiles of a plurality of similar users. For example, in some embodiments the system may set one or more preferences for the user 101 based on the profiles of other similar users, e.g., users that include similar user profiles. For example, thousands of users may have accounts with the service provider 110, and the service provider 110 can collect information about all the users. User profiles may be built by the service provider 110, and each account can include, but is not limited to, information explicitly given by a plurality of users, i.e., account information like social security numbers, drivers license numbers, home addresses, job descriptions, group membership information for each user, i.e., whether they are members of a family group, a work group, and/or members of a group based on their traits, i.e., single, mid-20s, car owner, home owner, etc. In some embodiments, the user profiles may contain information such as what products the users have purchased in the past from, for example, websites affiliated with, or maintained by, the service provider 110, or companies affiliated with the service provider 110.

A data mining service 114 can be configured to identify attributes shared by users, and group the users according to the attributes they share. In this example embodiment the service provider 110 can have access to the contents of a user's electronic address book for example, and the data mining service 114 can process the entries in electronic address books for a given group to determine how to configure the preferences for any particular user in the group. For example, if a user shares a statistically significant amount of contacts with another user in the same group, the service provider 110 can determine that these users are similar and some, or all, of preferences of the user can be used to set the preferences of the similar user and vice versa. In addition to configuring preferences related to shared contacts, the data mining service 114 can determine whether a contact should be inserted into the address book of a user. For example, the data mining service 114 can identify contacts that are in the address books of a plurality of users, and insert them into the address book of the user's mobile device 103. Similar to a user initiated save, the contact can be propagated to the mobile switching center 106 and transmitted to the mobile device 103 via an RF or packet based wireless network. In this example, the contact could contain information indicating that the contact was inserted because the user has similar interests as other users.

Continuing with the description of FIG. 8, operation 810 illustrates determining that the entry is associated with a user preference prior to selecting the telephone number for the entry, wherein the user preference authorizes the section of the telephone number. For example, in some example embodiments, the service provider 110 can setup a web server 125 and allow users such as user 101 to access their account and manage the entries of their electronic address book. In this example implementation, the user 101 can select an option that allows the service provider 110 to update the numbers for entries in the electronic address book, or the user 101 can select an option to keep the entries private and non-modifiable. In this example embodiment, the service provider 110, or the user, could select a preference that prevents certain contacts from being updated or even perceived by the service provider 110. For example, some contacts can be configured as either private or public, i.e., a service provider 110 may automatically configure all personal phone numbers as private contacts and all businesses as public. This allows users to prevent personal contacts from being distributed to other subscribers in the network.

Continuing with the description of FIG. 8, operation 812 illustrates transmitting a location of a member associated with the selected telephone number to the mobile device. For example, in some embodiments when the search service 111 has identified a member belonging to the class associated with the entry, the mobile switching center 106 can additionally be configured to transmit one or more packets of information indicative of the location of the members to the mobile device 103. The mobile device 103 can then be configured to render the location of the member on a user interface using techniques similar to those described above in preceding paragraphs.

Continuing with the description of FIG. 8, operation 814 illustrates transmitting a signal indicative of the entry to the mobile device. For example, in some embodiments of the present disclosure the mobile switching center 106 can transmit one or more packets of information indicative of the entry to the mobile device 103. For example, in some instances the entry can be generated at the service provider 110 by either the service provider 110 or the user 101 via the web server 125. In this example, the entry can be propagated to the mobile switching center 106 and transmitted to the mobile device 103 via an RF or packet based wireless network. More specifically, a user created entry named 'Pizza Place' can include metadata that defines that the class for this entry includes every brand of pizza delivery place. This entry can be routed to the mobile switching center 106 and transmitted to the mobile device 103 such that a contact in the mobile device's electronic address book says 'Pizza Place.'

Referring now to FIG. 9, it illustrates an alternative embodiment of the operational procedure of FIG. 8 including operation 916 that illustrates associating the mobile device with a first operating area; determining that the mobile device is located in a second operating area; and selecting the telephone number for the entity, wherein the telephone number is associated with a member that offers a product related to the second operating area For example, a location service 118 may locate a mobile device 103 within a network by using various techniques, and a comparison can be made between the mobile device's current position and the location that the mobile device normally operates in. In some embodiments this can be accomplished by comparing the GPS coordinates of the mobile device 103 to the latitude and longitude associated with the billing address of the user 101 and the device could be considered operating outside its normal area if it is a predetermined distance from the billing address. In some embodiments a mobile device 103 can be considered operating within its normal operating area if it is wirelessly connected to a cellular tower, for example tower 104, that services the zip code that the user 101 lives in, for example geographic area 120. In another example, a mobile device 103 could be considered operating outside of its normal area if it registers with a location register different than its home register, for example the remote mobile switching center 162. In yet another example, a mobile device 103 can be considered operation outside its normal area if it is connected to a cellular tower that services area codes different than the area code of the number associated with the account of the user that owns the mobile device 103. In a specific example, the service provider 110 can determine that a mobile device 103 has moved into a new area, i.e., from geographical area 120 to geographical area 120'. A specific example, may include a user 101 of a mobile device 103 that flies from Seattle (area 120 in this example) to New York City (area 120' in this example). When the user 101 exits the airplane and turns on their mobile device 103, the device can identify itself to the cellular network and register with the visitor location register. As one skilled in the art can appreciate, the above mentioned examples are illustrative only and the claims are not limited to the disclosed examples of determining whether a mobile device is outside of its normal operating area.

Once mobile device 103 has registered with area 120' or has been detected by the location service 118, the search module 111 can use select a telephone number associated with a member that belongs to the class that offers products, e.g., goods or services, that could be of interest to a person that is not normally in the area. For example, in some embodiments of the present disclosure, a directory can be maintained that includes members that are of interest to visitors of the area, e.g., tourist bureau members, hotels contacts, car rental members, tour members, etc. A specific example may include a user 101 taking a vacation to New York City, and when the user's mobile device 103 is identified; the network the search service 111 can obtain contact information for places such as a Statue of Liberty tour (at place 105-D for example). The search service 111 may perform such a search when a when a mobile device 103 registers with a mobile switching center 106 outside of its normal operating area 120. The search service 111 can then query a database 112 for member information of interest to visitors to the area. In one specific example, the search module 111 can be configured to obtain telephone numbers for all of the numbers in the area 120', or the top 10 numbers in area 120'.

Continuing with the example, once a member has been identified by the search service 111, an entry including information about the member such as its location and telephone number can be transmitted by the mobile switching center 106 to the mobile device 103 and stored in the device's electronic address book. Similar to that described above, in some instances the selection of a member can take into account a user profile of the user 101 associated with the mobile device 103. For example, in some instances certain members can be considered part of the same class, however a specific user may prefer one member over the another for personal, or objective reasons, e.g., a user profile could identify that a user has a particular brand loyalty, or the user 101 may have given the member a low rating on a questionnaire, etc., and the search service 111 may select an particular member based on this information. In a specific example, a user profile may indicate that a user 101 purchases all their consumer electronics at a Best Buy®, for example member 105-A and the user's profile reflects this taste. In this specific example the mobile device 103 is located closer to another member, for example member 105-B that also sells consumer electronics. In the event that the search service 111 receives a request to select a particular member in the class of consumer electronics stores, the search service 111 can select member 105-A since the user 101 prefers the store.

As illustrated by FIG. 10, operation 1008 depicts determining that the mobile device has left the second operating area; and transmitting a signal to the mobile device, wherein the signal includes a command to remove the telephone number for the entity that offers the product related to the second operating area from the address book. In another example, the search service 111 can be configured to receive location information from the location service 118 indicating when the mobile device 103 leaves the area. For example, when a user 101 drives out of town back to their local area, or when the user flies from New York back to Seattle. In this instance, when the mobile device 103 exits area 120', the service provider 110 can generate a signal that directs the mobile device 103 to remove the member from the electronic address book. When a mobile device 103 registers with area 120 the mobile switching center 106 can transmit the signal to the mobile device 103 and the mobile device 103 can delete the member that was associated with area 120'.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

What is claimed:

1. A method comprising:
    associating, via an application executing on a mobile device, the mobile device with a first operating area;
    determining, via the application, that the mobile device is located in a second operating area; and
    selecting, via the application, a telephone number for an entity based on:
        a class associated with the entity;
        a location of the mobile device; and
        the entity offering a product related to the second operating area
    storing the telephone number on the mobile device.

2. The method of claim 1, wherein the telephone number is selected in accordance with a user profile of a user associated with the mobile device.

3. The method of claim 1, wherein the telephone number is selected in accordance with a plurality of user profiles of a plurality of similar users.

4. The method of claim 1, further comprising:
    determining that the entry is associated with a user preference prior to selecting the telephone number, wherein the user preference authorizes the selection of the telephone number.

5. The method of claim 1, further comprising transmitting a location of a member associated with the selected telephone number to the mobile device.

6. The method of claim 1, further comprising transmitting a signal indicative of the entry to the mobile device.

7. The method of claim 1, further comprising:
    determining that the mobile device has left the second operating area; and
    removing the telephone number for the entity from the address book.

8. A computer-readable storage medium that is not a propagating signal, the computer-readable medium comprising executable instructions that when executed by a processor cause the processor to effectuate operations comprising:
    associating a mobile device with a first operating area;
    determining that the mobile device is located in a second operating area; and
    selecting a telephone number for an entity based on:
        a class associated with the entity;
        a location of the mobile device; and
        the entity offering a product related to the second operating area; and
    storing the telephone number on the mobile device.

9. The computer-readable storage medium of claim 8, wherein the telephone number is selected in accordance with a user profile of a user associated with the mobile device.

10. The computer-readable storage medium of claim 8, wherein the telephone number is selected in accordance with a plurality of user profiles of a plurality of similar users.

11. The computer-readable storage medium of claim 8, further comprising:
    determining that the entry is associated with a user preference prior to selecting the telephone number, wherein the user preference authorizes the selection of the telephone number.

12. The computer-readable storage medium of claim 8, further comprising transmitting a location of a member associated with the selected telephone number to the mobile device.

13. The computer-readable storage medium of claim 8, further comprising transmitting a signal indicative of the entry to the mobile device.

14. The computer-readable storage medium of claim 8, further comprising:
    determining that the mobile device has left the second operating area; and
    transmitting a signal to the mobile device, wherein the signal includes a command to remove the telephone number from the address book.

15. An apparatus comprising:
    a processor; and
    memory coupled to the processor, the memory comprising executable instructions that when executed by the processor cause the processor to effectuate operations comprising:
        associating a mobile device with a first operating area;
        determining that the mobile device is located in a second operating area; and
        selecting a telephone number for an entity based on:
            a class associated with the entity;
            a location of the mobile device; and the entity offering a product related to the second operating area storing the telephone number on the mobile device.

16. The apparatus of claim 15, further comprising:

determining that the entry is associated with a user preference prior to selecting the telephone number, wherein the user preference authorizes the selection of the telephone number.

17. The apparatus of claim 15, further comprising transmitting a location of a member associated with the selected telephone number to the mobile device.

18. The apparatus of claim 15, further comprising transmitting a signal indicative of the entry to the mobile device.

* * * * *